United States Patent Office 3,000,931
Patented Sept. 19, 1961

---

3,000,931
PROCESS FOR THE PREPARATION OF
NITROCARBAMATES
Milton B. Frankel, Pasadena, Calif., assignor to Aerojet-General Corporation, Azusa, Calif., a corporation of Ohio
No Drawing. Filed Jan. 17, 1955, Ser. No. 482,408
8 Claims. (Cl. 260—482)

This invention relates to new compositions of matter and a method for their preparation. In particular, it relates to nitrocarbamates having the general formula:

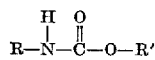

wherein R is a nitroalkyl radical and R' is a radical selected from the group consisting of alkyl, cycloalkyl and aryl radicals.

The compounds of this invention are prepared by condensing a nitro isocyanate with alcohol, in accordance with the general reaction scheme set forth below:

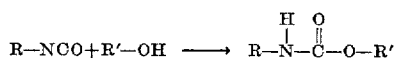

wherein R and R' are as defined above.

As a matter of convenience, the reaction is usually conducted at reflux temperature. Although the reaction can be performed at lower temperatures, the rate of reaction is too slow for practical purposes, while at higher temperatures, the reaction is difficult to control. Increased smoothness and control of the reaction are achieved when the reaction is conducted in the presence of an inert solvent such as chloroform.

The nitro-isocyanates used as starting materials in this invention are prepared by reacting nitro-acid halides with sodium azide and heating the resultant organic azide under anhydrous conditions to effect its rearrangement to the isocyanate, as disclosed in assignee's copending applications Serial No. 405,515, filed January 21, 1954, and now U.S. Patent No. 2,923,726 and Serial No. 416,386, filed March 15, 1954 now abandoned. The nitro-acid halides are obtained in the conventional manner by reacting a thionyl halide with a nitro-acid, such as 3,3-dinitrobutanoic and 3,3-dinitropentanoic acid. A wide variety of such nitro-acids are obtained by condensing unsaturated acids, such as acrylic acid, with nitronate salts of alkanes, as described in the J. Org. Chem., vol. 16, pp. 161–4, 1951.

To more clearly illustrate my invention, the following examples are presented. It is to be understood, however, that these examples are presented merely as a means of illustration and are not intended to limit the scope of the invention in any way.

EXAMPLE I

*Preparation of N-3,3,3-trinitropropyl ethyl carbamate*

28 gm. of N-3,3,3-trinitropropyl isocyanate, 100 ml. of absolute ethanol and 200 ml. of chloroform were placed in a round bottomed flask fitted with a condenser and drying tube. The solution was refluxed for three hours. The resulting yellow solution was concentrated to give a residue, which crystallized as a white solid. The solid was collected and washed with cyclohexane; the yield was 17.1 gm. (49.2%) of N-3,3,3-trinitropropyl ethyl carbamate, M.P. 62–64° C. A sample was recrystallized twice from cyclohexane to give long white crystals (M.P. 65–65.5° C., impact stability >100 cm.) and dried at room temperature under reduced pressure. An elemental analysis of the product is as follows:

Calculated for $C_6H_{10}N_4O_8$: %C, 27.07; %H, 3.79; %N, 21.05. Found: %C, 27.63; %H, 3.94; %N, 21.56.

EXAMPLE II

*Preparation of N-2,2,2-trinitropropyl cyclohexyl carbamate*

100 ml. chloroform, 2 gm. (0.02 mole) of cyclohexanol and 4.8 gm. of 3,3,3-trinitropropyl isocyanate were placed in a 250 ml. round bottom flask fitted with a condenser and drying tube. The solution refluxed for 15 hours and concentrated. The residue was recrystallized from cyclohexane to give 2.6 gm. (40.6%) of white solid, M.P. 88–90° C., impact stability >100 cm./2 kg. A sample was recrystallized twice more from cyclohexane, M.P. 96–97° C., and dried under reduced pressure at 41° C. An elemental analysis of the product is as follows:

Calculated for $C_{10}H_{16}N_4O_8$: %C, 37.52; %H, 5.04; %N, 17.51. Found: %C, 37.79; %H, 5.00; %N, 17.09.

EXAMPLE III

*Preparation of N-3,3,3-trinitropropyl phenyl carbamate*

11 gm. (0.05 mole) of 3,3,3-trinitropropyl isocyanate, 4.7 gm. (0.05 mole) of phenol, and 100 ml. of chloroform were placed in a 250 ml. round bottom flask, fitted with a condenser and drying tube. The solution was refluxed for 16 hours and concentrated in vacuo, leaving a yellow solid as residue. The solid was dissolved in a minimum amount of absolute ethanol at room temperature and water was added dropwise until white crystals separated. This purification was repeated, and the yield of N-3,3,3-trinitropropyl phenyl carbamate was 10.0 gm. (63.7%), M.P. 102–103° C., impact stability >100 cm./2 kg. A sample was dried under reduced pressure at 41° C. An elemental analysis of the product is as follows:

Calculated for $C_{10}H_{10}N_4O_8$: %C, 38.22; %H, 3.21; %N, 17.83. Found: %C, 38.46; %H, 3.23; %N, 17.63.

A wide variety of compounds can be prepared in accordance with the examples set forth above. N-3,3-dinitrobutyl ethyl carbamate is prepared by condensing 3,3-dinitrobutyl isocyanate with ethanol; N-3,3,3-trinitropropyl cyclopentyl carbamate is prepared by condensing 3,3,3-trinitropropyl isocyanate with cyclopentanol; and N-3,3,3-trinitropropyl-α-naphthyl carbamate is prepared by condensing 3,3,3-trinitropropyl isocyanate with α-naphthanol.

It is apparent from the above discussion that any member of the above series of nitrocarbamates can be prepared by condensing the appropriate nitro isocyanate with an alcohol, according to the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:
1. The method of preparing nitrocarbamates having the formula:

$$R-N(H)-COR'$$

which comprises reacting a nitro-isocyanate having the formula:

$$R-NCO$$

with an alcohol having the formula:

$$R'-OH$$

wherein R is a lower nitroalkyl radical and R' is a radical selected from the group consisting of lower alkyl, cycloalkyl and unsubstituted aryl hydrocarbon radicals.

2. The method of claim 1 wherein the reaction is conducted in the presence of an inert organic solvent.

3. The method of preparing N-3,3,3-trinitropropyl ethyl carbamate which comprises reacting 3,3,3-trinitropropyl isocyanate with ethyl alcohol.

4. The method of preparing N-3,3,3-trinitropropyl cyclohexyl carbamate which comprises reacting 3,3,3-trinitropropyl isocyanate with cyclohexyl alcohol.

5. The method of preparing N-3,3,3-trinitropropyl phenyl carbamate which comprises reacting 3,3,3-trinitropropyl isocyanate with phenol.

6. The method of preparing N-3,3-dinitrobutyl ethyl carbamate which comprises reacting 3,3-dinitrobutyl isocyanate with ethanol.

7. The method of preparing N-3,3,3-trinitropropyl cyclopentyl carbamate which comprises reacting 3,3,3-trinitropropyl isocyanate with cyclopentanol.

8. The method of preparing N-3,3,3-trinitropropyl-α-naphthyl carbamate which comprises reacting 3,3,3-trinitropropyl isocyanate with α-naphthol.

References Cited in the file of this patent

UNITED STATES PATENTS

| | | |
|---|---|---|
| 2,433,595 | Campbell | Dec. 30, 1947 |
| 2,677,698 | Deutschman et al. | May 4, 1954 |
| 2,683,728 | Mastin et al. | July 13, 1954 |

FOREIGN PATENTS

| | | |
|---|---|---|
| 138,456 | Sweden | Dec. 23, 1952 |